United States Patent
Huang et al.

[11] Patent Number: 6,104,581
[45] Date of Patent: Aug. 15, 2000

[54] DUAL COIL ROTARY ACTUATOR

[75] Inventors: Fu-Ying Huang; Wayne Isami Imaino, both of San Jose; Jiann-Chang Lo, Cupertino; Roger William Wood, Gilroy, all of Calif.

[73] Assignee: International Business Machines Corporation, Armonk, N.Y.

[21] Appl. No.: 09/167,127

[22] Filed: Oct. 5, 1998

[51] Int. Cl.[7] .............................. G11B 5/55; G11B 21/08
[52] U.S. Cl. .................... 360/264.7; 360/265; 360/265.8
[58] Field of Search .............................. 360/97.01, 98.01, 360/103–106, 260, 264.3, 264.7, 264.2, 265, 265.8, 264.1

[56] References Cited

U.S. PATENT DOCUMENTS

| | | | |
|---|---|---|---|
| 4,314,295 | 2/1982 | Frandsen | 360/106 |
| 4,587,714 | 5/1986 | Morris | 29/594 |
| 4,612,592 | 9/1986 | Frandsen | 360/106 |
| 4,868,432 | 9/1989 | Frandsen | 310/12 |
| 4,916,342 | 4/1990 | Hirano et al. | 310/51 |
| 4,967,296 | 10/1990 | Wiens et al. | 360/106 |
| 5,267,110 | 11/1993 | Ottesen et al. | 360/106 |
| 5,621,591 | 4/1997 | Rahimi et al. | 360/106 |

FOREIGN PATENT DOCUMENTS

| | | |
|---|---|---|
| 63-198569 | 8/1988 | Japan . |
| 10-233068 | 9/1988 | Japan . |
| 3-265455 | 11/1991 | Japan . |

*Primary Examiner*—William Klimowicz
*Attorney, Agent, or Firm*—Robert M. Martin; Noreen A. Krall

[57] ABSTRACT

An actuator assembly having two coils disposed between the poles of a voice coil motor (VCM) magnet for improved dynamic performance during settling and tracking operations in a disk drive. The two coils in the VCM are connected to separate current sources to allow the current flow in the two coils to have the same sense (clockwise or counterclockwise) or the opposite sense with respect to each other. When the current flows in the two coils have the opposite sense, excitation of the principal in-plane bending mode resonance of the actuator assembly is suppressed allowing the use of an increased servo bandwidth for settling and tracking operations of the disk drive. During seek operations of the disk drive, where maximum torque on the actuator is desirable, the coil currents in the two coils are chosen to have the same sense so that the forces on the actuator from the two coils are additive.

6 Claims, 15 Drawing Sheets

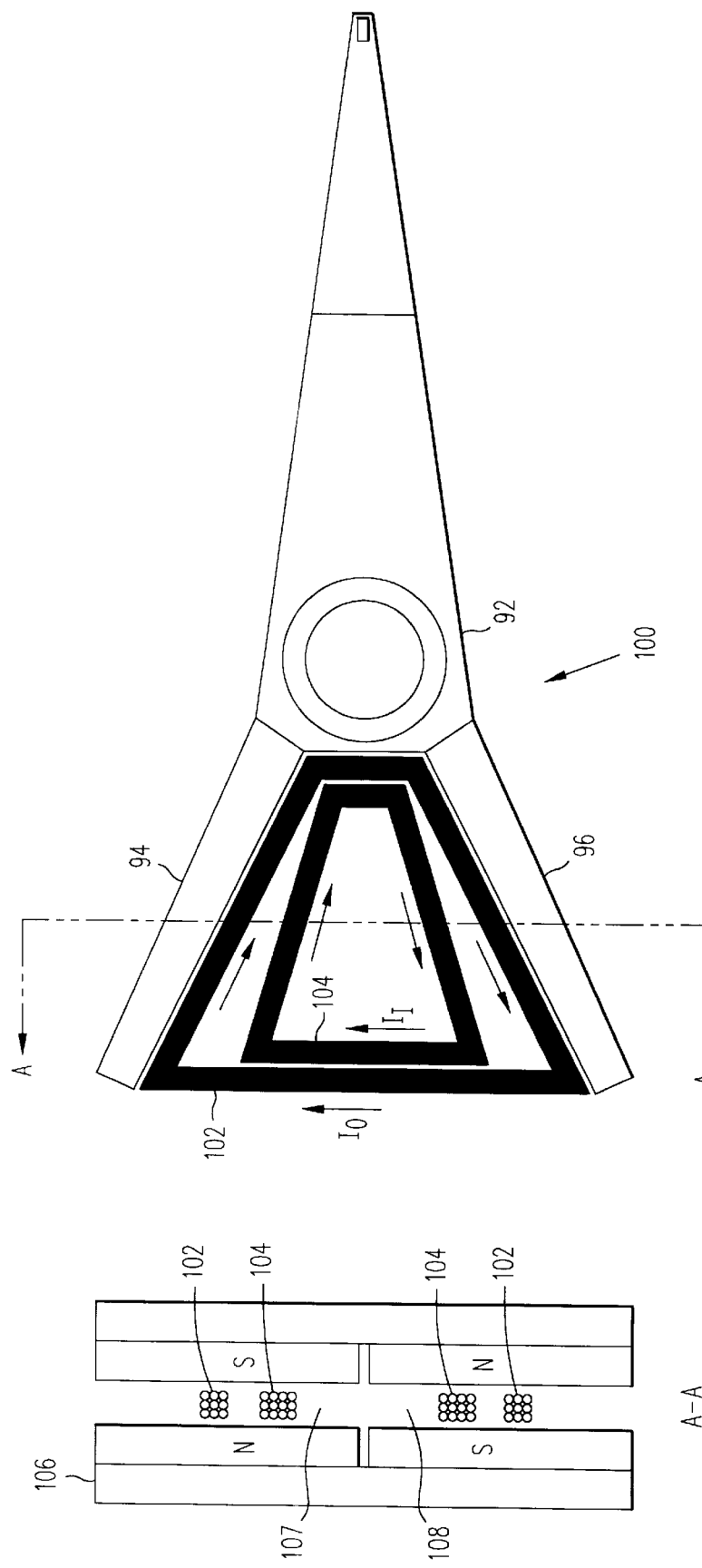

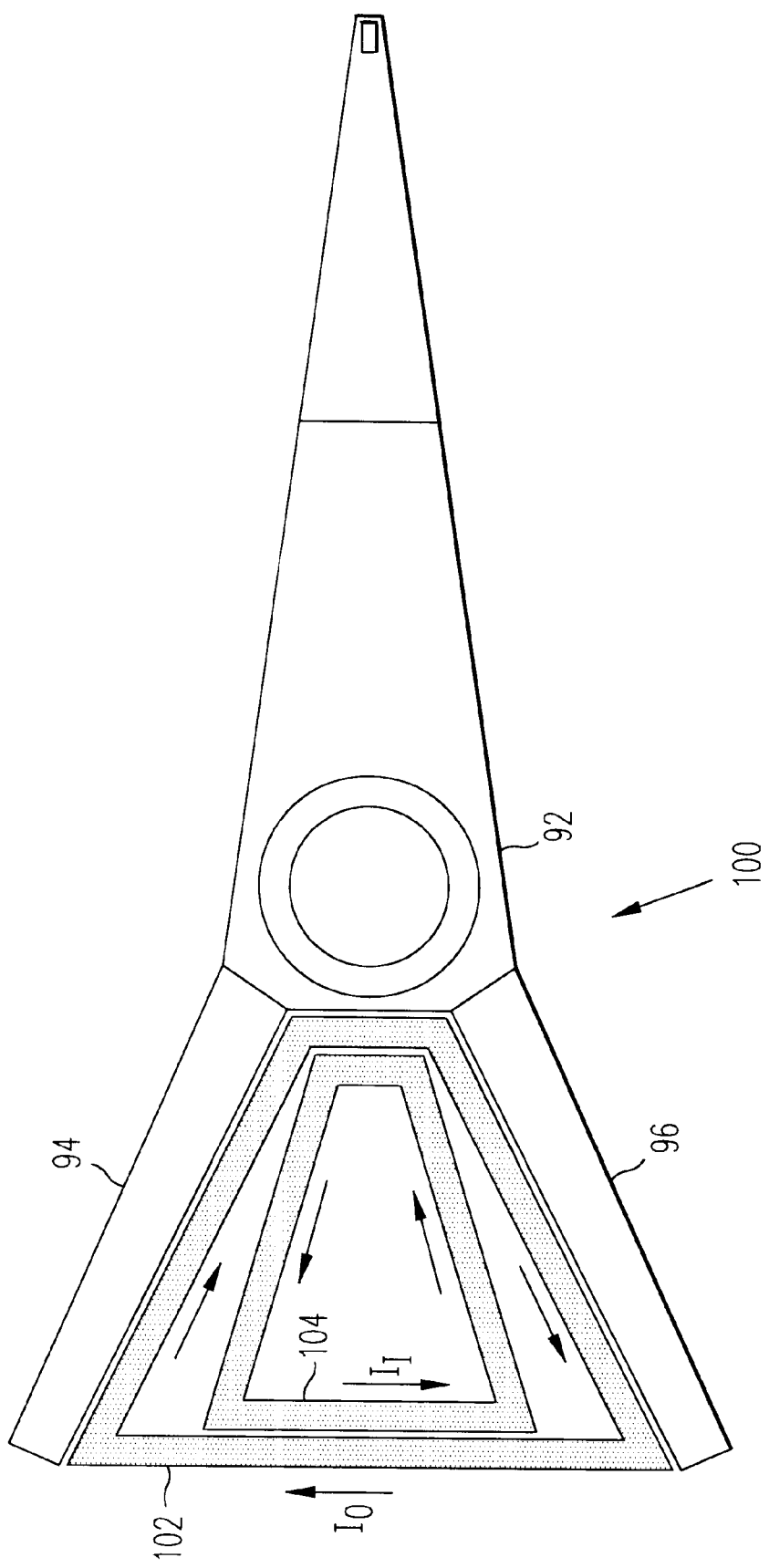

DUAL COIL ROTARY ACTUATOR

BACKGROUND OF THE INVENTION

1. Field of the Invention

This invention relates generally to computer hard disk drives and, more particularly, to improvements to the rotary actuator of hard disk drives for better dynamic performance.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus the suspension provides desired slider loading and dimensional stability between the slider and an actuator positioner arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single positioner arm extending from a pivot point, or alternatively, a plurality of positioner arms arranged in a comb-like fashion extending from a pivot point. A rotary voice coil motor (VCM) is attached to the rear portion of the actuator assembly to power movement of the actuator over the disks.

The VCM located at the rear portion of the actuator assembly is comprised of a top plate spaced above a bottom plate with a magnet or pair of magnets therebetween. The VCM further includes an electrically conductive coil disposed within the rearward extension of the actuator assembly and between the top and bottom plates, while overlying the magnet in a plane parallel to the magnet. In operation, current passes through the coil and interacts with the magnetic field of the magnet so as to rotate the actuator assembly around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

During operation of the disk drive, the actuator, driven by the VCM, is positioned radially over the disk surface under the control of a positioning servo system. The servo system is designed to accurately position the read/write transducer over a selected data track on the disk in as short a time as possible (seek operation) and to maintain the read/write transducer position over the data track as accurately as possible (track operation). As data storage density of disk drives is increased, the radial density of data tracks on the disk is increased. The ability of the servo system to accurately track on the resulting narrower data tracks becomes a limitation on the disk drive performance.

Actuator assemblies have resonant frequencies that can adversely affect the performance of the servo system. The resonances having the lowest frequencies severely limit the bandwidth of the servo system resulting in poor high frequency response and degraded disk drive performance.

It therefore can be seen that there is a need for an actuator that has improved frequency response to reduce the modes of vibration on the actuator that can adversely affect the tracking performance of the disk drive.

SUMMARY OF THE INVENTION

To overcome the shortcomings of the prior art described above, it is an object of the present invention to disclose an improved actuator assembly that has reduced modes of vibration, thereby resulting in improved performance and stability.

It is another object of the present invention to disclose an improved actuator assembly having a voice coil motor (VCM) comprising dual coils to reduce the modes of vibration in tracking operation, thereby improving disk drive performance.

It is a further object of the present invention to disclose a method of operating the improved actuator including dual coils to reduce the modes of vibration in tracking operation, thereby improving disk drive performance.

In accordance with the principles of the present invention, there is disclosed an actuator assembly for magnetic storage disk drives comprising dual actuator coils disposed within the rearward extensions of the actuator assembly. In one embodiment of the present invention, an outer coil and a concentric inner coil fixed to the rearward extensions of the actuator assembly lie in the plane in which the actuator is free to rotate when mounted in a disk drive. Both the outer coil and the inner coil are disposed between the magnetic poles of a voice coil motor (VCM) magnet. The outer coil and the inner coil are electrically connected to a first current supply and a second current supply, respectively, where the current magnitude and sense of current flow of each current supply is individually controlled by the disk Drive controller electronics. During settling and tracking operations of the disk Drive, the current flow in the inner coil has the opposite sense (clockwise or counterclockwise) to the current flow in the outer coil, resulting in a net force on the actuator to position the slider/transducer on the desired data track with improved accuracy. The improved accuracy is obtained by adjusting the relative current flow in each coil so as to suppress excitation of the principal in-plane bending (sway) mode of the actuator allowing the use of an increased servo bandwidth for settling and tracking operations. During seek operations of the disk drive, where maximum torque on the actuator is desirable to rapidly locate the slider/transducer over a new track, the coil currents in the outer coil and the inner coil are chosen to have the same sense so that the forces on the actuator from the two coils are additive.

One advantage of the present invention is that it provides an actuator assembly having improved performance and stability. An additional advantage of the present invention is that the existing VCM magnet and plates can be used, thereby providing a simple and cost effective solution.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIGS. 4a and 4b are plan views of an actuator including concentric dual coils of a first embodiment of the present invention; FIG. 4c is a cross-section view of the VCM magnet showing the concentric dual coils in the VCM magnet gap;

DETAILED DESCRIPTION OF THE PREFERRED EMBODIMENT

This invention is described in a preferred embodiment in the following description with reference to the Figures.

While this invention is described in terms of the best mode for achieving this invention's objectives, it will be appreciated by those skilled in the art that variations may be accomplished in view of these teachings without deviating from the spirit or scope of the invention.

Figure 1:
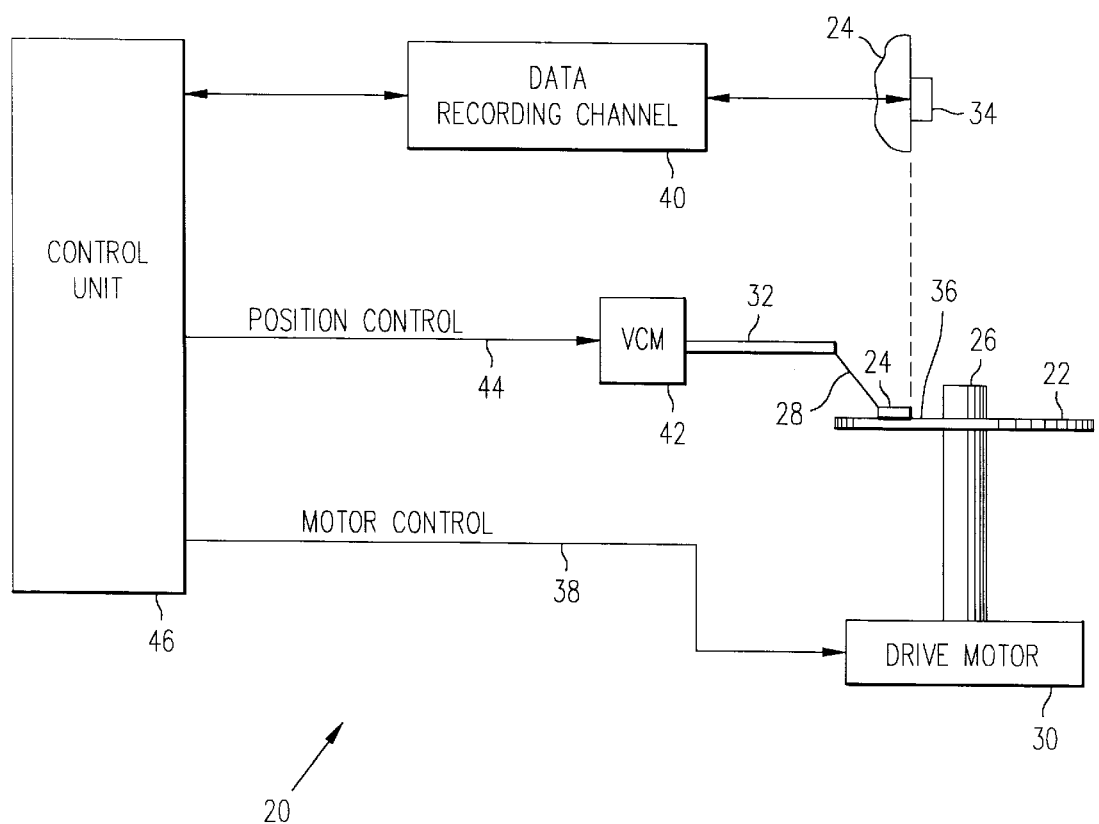
FIG. 1 is a simplified drawing of a magnetic recording disk drive system.

Referring now to FIG. 1, there is shown a disk drive 20 embodying the present invention. As shown in FIG. 1, at least one rotatable magnetic disk 22 is supported on a spindle 26 and rotated by a disk drive motor 30. The magnetic recording media on each disk is in the form of an annular pattern of concentric data tracks (not shown) on the disk 22.

At least one slider 24 is positioned on the disk 22, each slider 24 supporting one or more magnetic read/write heads 34.

As the disks rotate, the slider 24 is moved radially in and out over the disk surface 36 so that the heads 34 may access different portions of the disk where desired data is recorded. Each slider 24 is attached to a positioner arm 32 by means of a suspension 28. The suspension 28 provides a slight spring force which biases the slider 24 against the disk surface 36. Each positioner arm 32 is attached to an actuator 42 means. The actuator means as shown in FIG. 1 may be a voice coil motor (VCM). The VCM comprises a coil movable within a fixed magnetic field, the direction and speed of the coil movements being controlled by the motor current signals supplied by the control unit 46.

During operation of the disk storage system, the rotation of the disk 22 generates an air bearing between the slider 24 and the disk surface 36 which exerts an upward force or lift on the slider. The air bearing thus counter-balances the slight spring force of the suspension 28 and supports the slider 24 off and slightly above the disk surface by a small, substantially constant spacing during normal operation.

The various components of the disk storage system are controlled in operation by control signals generated by a control unit 46, such as access control signals and internal clock signals. Typically, the control unit 46 comprises logic control circuits, storage chips and a microprocessor. The control unit 46 generates control signals to control various system operations such as drive motor control signals on line 38 and head position and seek control signals on line 44. The control signals on line 44 provide the desired current profiles to optimally move and position the slider 24 to the desired data track on the disk 22. Read and write signals are communicated to and from the read/write heads 34 by means of a recording channel 40.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
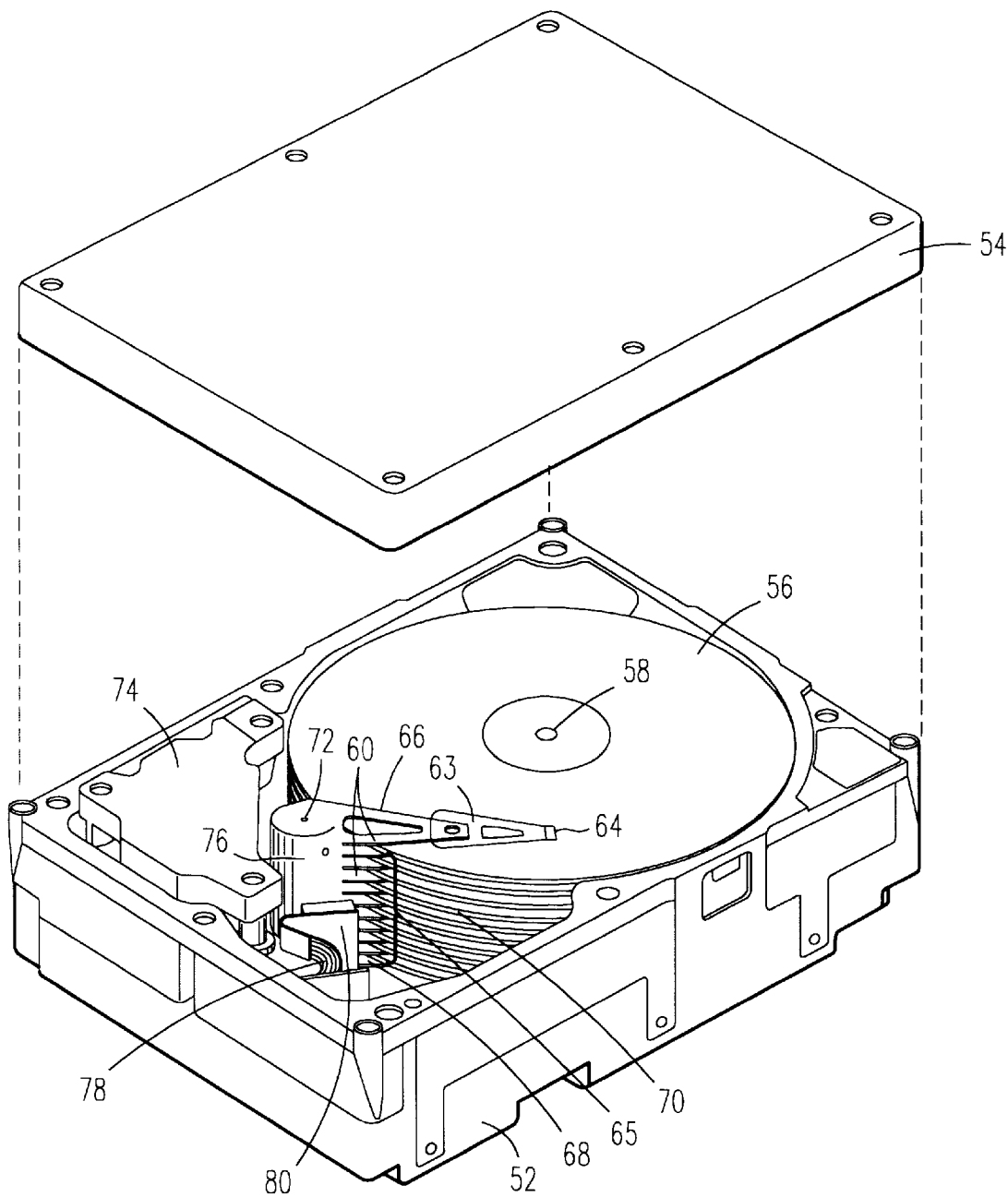
FIG. 2 is a perspective view of a disk drive.

FIG. 2 shows a hard disk drive 50 using the dual coil actuator of the present invention. The lid 54 of the disk drive is shown exploded. In operation, the lid would be disposed on top of the housing 52. The disk drive 50 comprises one or more magnetic disks 56. The disks may be conventional particulate or thin film recording disks, which are capable of storing digital data in concentric tracks. In a preferred embodiment, both sides of the disks 56 are available for storage, and it will be recognized by one of ordinary skill in the art that the disk drive 50 may include any number of such disks 56.

The disks 56 are mounted to a spindle 58. The spindle 58 is attached to a spindle motor (not shown) which rotates the spindle 58 and the disks 56 to provide read/write access to the various portions of the concentric tracks on the disks 56.

An actuator assembly 76 includes a positioner arm 60, and a suspension assembly 62. The suspension assembly 62 includes a slider/transducer assembly 64 at its distal end. Although only one slider/transducer assembly 64 of the suspension assembly 62 is shown, it will be recognized that the disk drive 50 has one slider/transducer assembly 64 for each side of each disk 56 included in the disk drive 50. The positioner arm 60 further comprises a pivot 72 around which the positioner arm 60 pivots.

The disk drive 50 further includes a read/write chip 80. As is well known in the art, the read/write chip 80 cooperates with the slider transducer assembly 64 to read data from or write data to the disks 56. A flexible printed circuit member or actuator flex cable 78 carries signals between the read/write chip 80 and a connector pin assembly (not shown) which interfaces with the external signal processing electronics.

The main function of the actuator assembly 76 is to move the positioner arm 60 around the pivot 72. Part of the actuator assembly 76 is the voice coil motor (VCM) assembly 74 which comprises a VCM bottom plate, a magnet and a VCM top plate in combination with a dual actuator coil. Current passing through the actuator coil interacts with the magnetic field of the magnet to rotate the positioner arm 60 and suspension assembly 62 around the pivot 72, thus positioning the slider/transducer assembly 64 as desired.

Most disk drives 50 have a number of disks 56 mounted on the spindle 58 to form a disk stack 70. The actuator assembly 76 comprises a plurality of positioner arms 60 fixed in a comb-like arrangement such that the inner arms 65 fit between the disks 56 forming disk stack 70 and the outer arms 66, 68 extend over the top surface of the top disk and the bottom surface of the bottom disk, respectively. The inner arms 65 each support two suspension assemblies 62 (upper and lower suspension assemblies) with attached slider/transducer assemblies 64. The upper outer arm 66 supports one suspension assembly 62 with its slider/transducer assembly 64 to access data on the top surface of the top disk of disk stack 70. The lower outer arm 68 supports one suspension assembly 62 with its slider/transducer assembly 64 to access data on the bottom surface of the bottom disk of disk stack 70.

Figure 3:
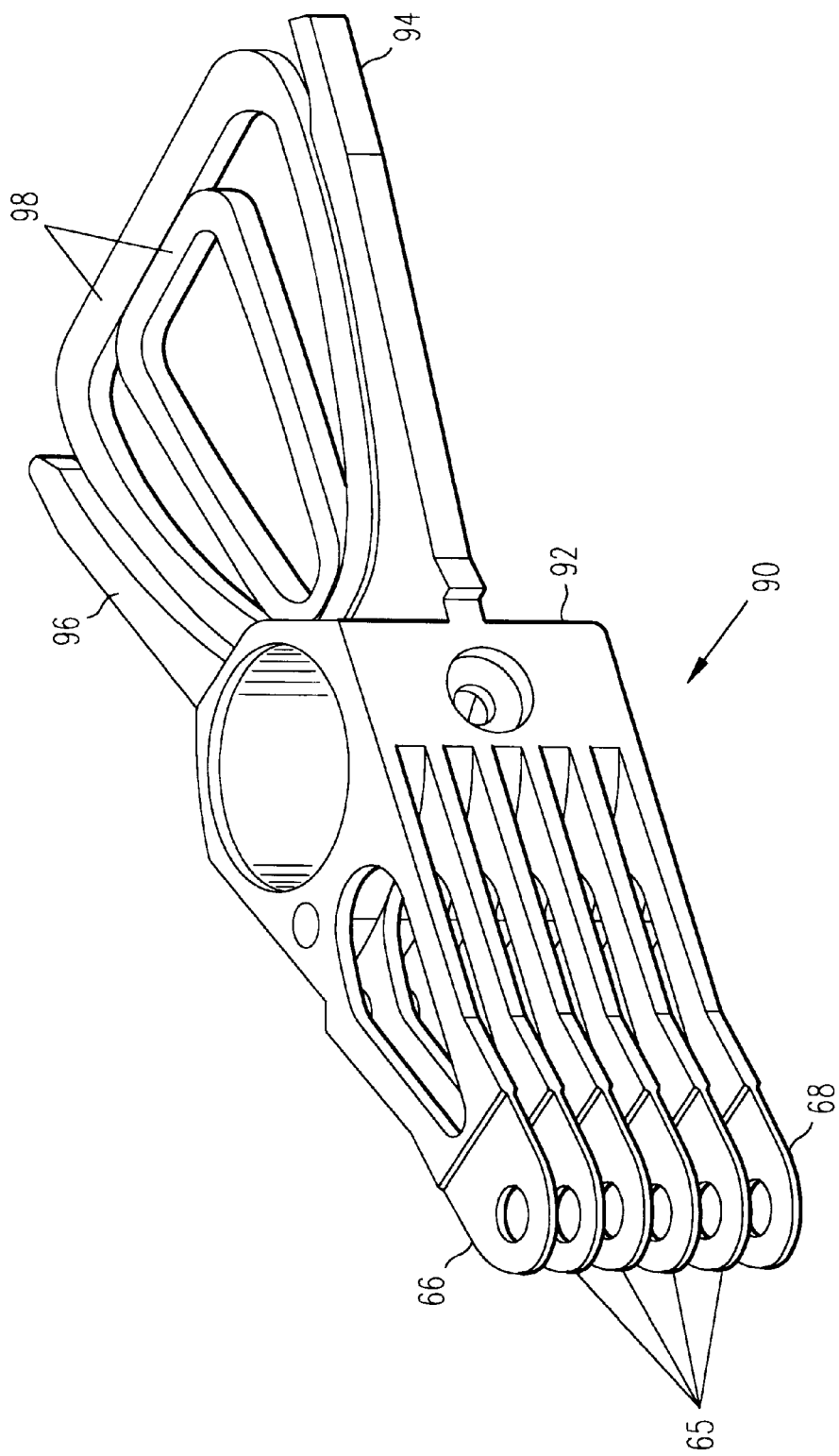
FIG. 3 is a perspective view of a rotary actuator according to the present invention.

FIG. 3 is a perspective view of an actuator assembly 90 according to an embodiment of the present invention. The actuator assembly 90 comprises a body 92, a lower outer arm 68, an upper outer arm 66, one or more inner arms 65, actuator coil supporting arms 94, 96 and concentric dual actuator coils 98 fixed to the actuator coil supporting arms 94, 96. The body 92 is supported by bearings (not shown) which allow the actuator assembly 90 to rotate about a vertical axis when the actuator assembly 90 is mounted in a disk drive. The body 92 supports positioner arms 65, 66, 68 which in turn support the suspension assemblies (not shown) on which slider/transducer assemblies (not shown) are fixed. The actuator coil support arms 94, 96 support the actuator coils 98 which are part of the VCM assembly which works to position the actuator assembly radially with respect to the disk surfaces.

When installed in a disk drive, the actuator assembly 90 with suspension assemblies fixed on the positioner arms 65, 66, 68 is rotated by the VCM motor to position the slider/transducer assemblies at the desired disk radius to read or write data on a data track on the recording media coating the disk surface. The forces applied to the actuator assembly 90 by the VCM motor can excite mechanical resonances of the actuator assembly. Resonances of the actuator assembly 90 in the plane of the radial motion of the actuator assembly 90 are of particular concern since they directly affect the dynamic performance of the actuator in positioning the slider/transducer assemblies over the desired data track.

FIGS. 4a and 4b show plan views of a dual coil actuator assembly 100 according to a first embodiment of the present invention. The actuator assembly 100 comprises a body 92, actuator coil support arms 94 and 96 fixed to the body and extending rearward from the body 92, an outer actuator coil 102 located between and fixed to the actuator support arms 94 and 96, and an inner actuator coil 104 located inside the outer actuator coil 102 in a generally concentric arrangement. The inner coil 104 is fixed to the outer coil 102 with both coils lying in the plane defined by the actuator support arms 94 and 96. The outer coil 102 is formed of a number n turns of wire which go around the sides of the generally trapezoidal plan of the coil and have starting and ending locations (not shown) near to one another. The inner coil 104 is formed of a number m turns of wire which go around the sides of the generally trapezoidal plan of the coil and have starting and ending locations (not shown) near to one another. In the preferred embodiment of the present invention the number n of turns of the outer coil 102 are equal to the number m of turns of the inner coil 104. Alternatively, the number of turns n and m may be chosen to be different. Electrical connections (not shown) to the ends of the outer coil 102 and to the ends of the inner coil 104 enable the coils to carry currents thereby generating magnetic fields which interact with the magnetic field of the VCM magnet 106 shown in the cross-sectional view of FIG. 4c.

FIG. 4c shows a cross-sectional view of the VCM magnet 106. The VCM magnet 106 is formed to have a first zone 107 and a second zone 108, wherein the direction of the magnetic field in the first zone 107 is opposite in direction to the magnetic field in the second zone 108.

Referring again to FIG. 4a, the directions of current flow in the outer and inner coils 102 and 104 are shown for a seek operation of the disk drive where maximum torque on the actuator 100 is desired in order to position the slider/transducer assembly 64 on a new track as rapidly as possible. For the seek operation, the current flow is in the same direction, in either a clockwise or an counterclockwise sense, in both the outer coil 102 and the inner coil 104. The magnetic fields generated by the currents in each coil interact with the magnetic field of the VCM magnet 106 to produce forces that add together to produce a large resultant torque on the actuator. In the seeking operational mode, the dynamic response of the dual coil actuator is similar to the response of a prior art single coil actuator.

FIG. 4b shows the directions of current flow in the outer and inner coils 102 and 104 for settling and tracking operations of the disk drive where large torques are not needed but improved dynamic response of the actuator is needed to provide precise tracking performance. For the settling and tracking operations, the current flow in the outer coil 102 has the opposite sense to the current flow in the inner coil 104. The excitation of the sway mode by forces generated from each coil due to interaction with the VCM magnet 106 tend to cancel. However, the net torque on the actuator is non-zero which drives the actuator for the settling and tracking mode of operation. In the settling and tracking mode of operation, the dynamic response of the actuator is improved over the single coil actuator response due to reduced excitation of a resonance of the principal in-plane bending mode (sway mode) of the actuator. By a suitable choice of the ratio, $I_O/I_I$, of the magnitude of the current $I_O$ flowing in the outer coil 102 to the magnitude of the current $I_I$ flowing in the inner coil 104, the sway mode resonance may be completely suppressed for the best dynamic response of the actuator according to the present invention.

Figure 5A:
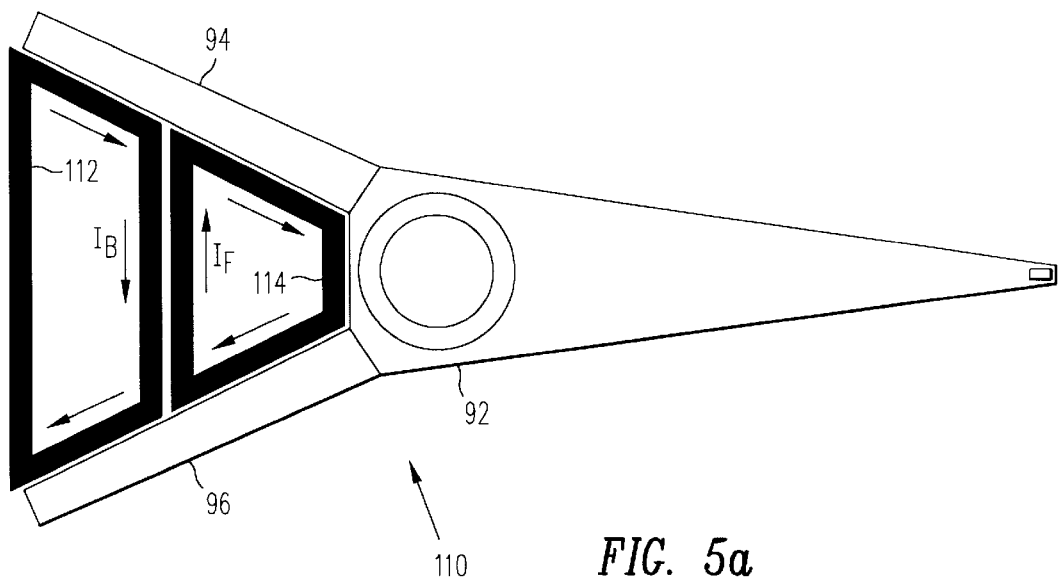
FIGS. 5a and 5b are plan views of an actuator including front-and-back dual coils of a second embodiment of the present invention.
Figure 5B:
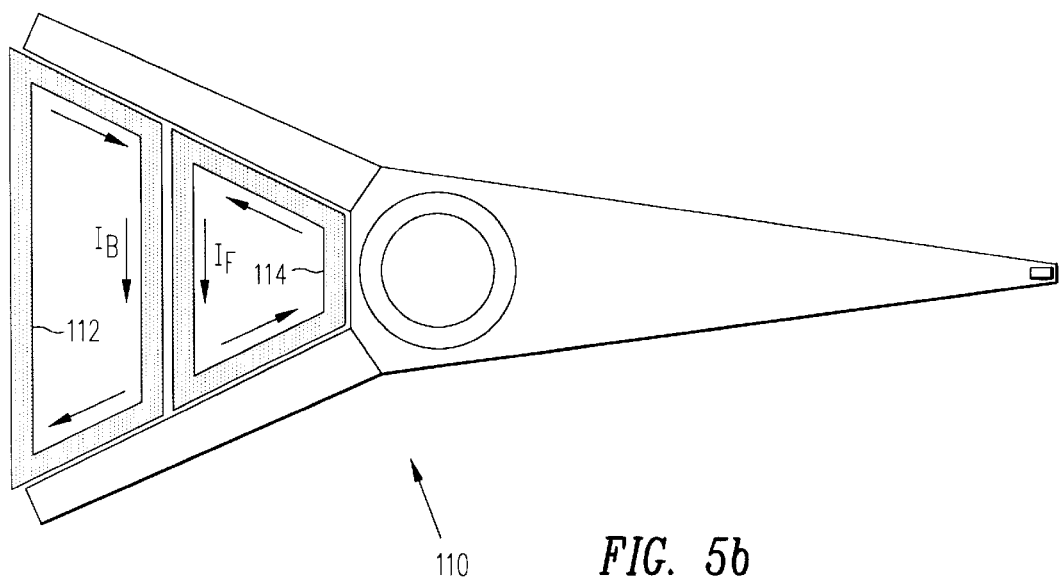

FIGS. 5a and 5b show plan views of a dual coil actuator assembly 110 according to a second embodiment of the present invention. The actuator assembly 110 comprises a body 92, actuator coil support arms 94 and 96 fixed to the body and extending rearward from the body 92, a back coil 112 located between and fixed to the actuator support arms 94 and 96 at the distal ends of the support arms, and a front coil 114 located between the actuator support arms 94 and 96 and disposed between the back coil 112 and the actuator body 92. The front coil 114 is fixed to actuator support arms 94 and 96 and to the contiguous segment of the back coil 112. Both coils lie in the plane defined by the actuator support arms 94 and 96. The back coil 112 is formed of a number n turns of wire which go around the sides of the generally trapezoidal plan of the coil and have starting and ending locations (not shown) near to one another. The front coil 114 is formed of a number m turns of wire which go around the sides of the generally trapezoidal plan of the coil and have starting and ending locations (not shown) near to one another. In this embodiment of the present invention the number n of turns of the back coil 112 are equal to the number m of turns of the front coil 114. Alternatively, the number of turns n and m may be chosen to be different. Electrical connections (not shown) to the ends of the back coil 112 and to the ends of the front coil 114 enable the coils to carry currents thereby generating magnetic fields which interact with the magnetic field of the VCM magnet 106.

FIGS. 5a and 5b show the directions of current flow in the coils for seeking and settling/tracking operations, respectively. In the seeking operation shown in FIG. 5a, the directions of current flow in the back coil 112 and the front coil 114 have the same sense, that is currents in both coils are either clockwise or counterclockwise depending on the direction of actuator rotation desired. The torques acting on the actuator due to the currents flowing in the coil segments parallel to the actuator support arms are additive resulting in the maximum net torque to rapidly position the slider/transducer on a new track. In the settling/tracking mode of operation shown in FIG. 5b, the direction of current flow in the back coil 112 has the opposite sense to the direction of current flow in the front coil 114. The excitation of the sway mode of the actuator by forces generated from each coil due to interaction with the magnetic field from the VCM magnet 106 tend to cancel. However, the net torque on the actuator is non-zero which drives the actuator in the settling and tracking mode of operation. In the settling and tracking mode of operation, the dynamic response of the actuator is improved over the single coil actuator response due to reduced excitation of a resonance of the principal in-plane bending mode (sway mode) of the actuator. Complete suppression of the sway mode resonance is achieved by suitable adjustment of the ratio, $I_B/I_F$, of the magnitude of the current $I_B$ flowing in the back coil 112 to the magnitude of the current $I_F$ flowing in the front coil 114.

Figure 6A:
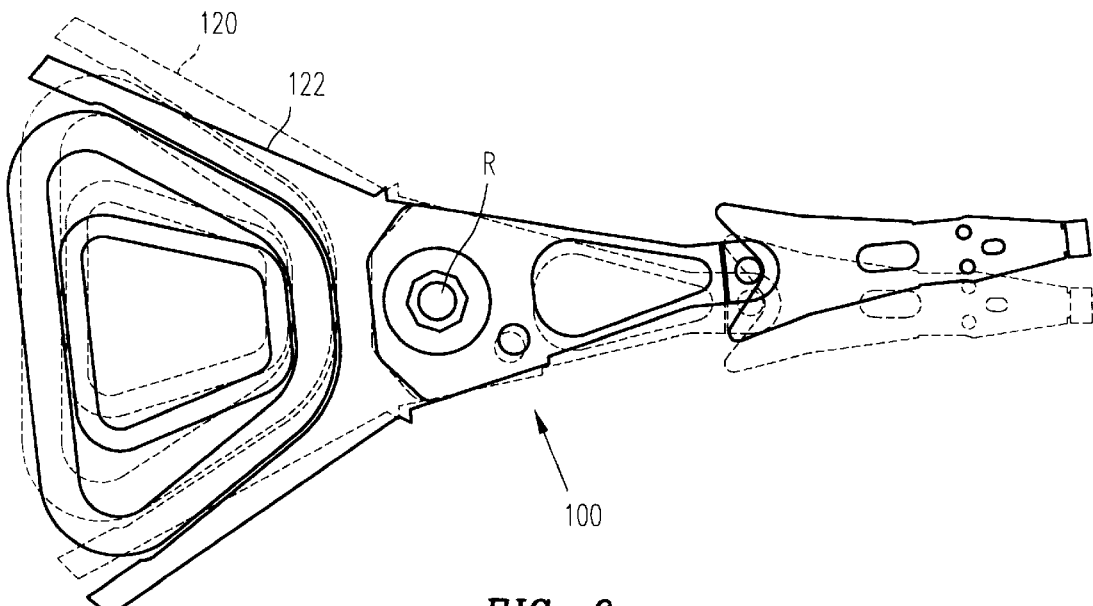
FIG. 6a is a plan view of an actuator including the concentric outer and inner dual coils of the present invention showing the mode shape (not to scale) of a principal in-plane bending (sway) mode resonance.
Figure 6B:
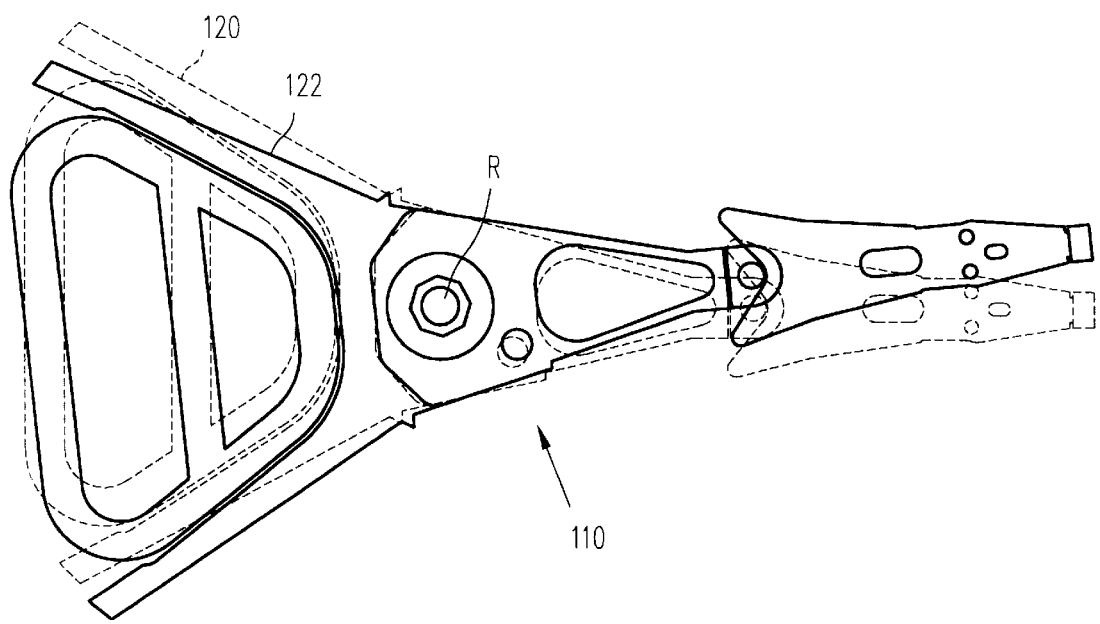
FIG. 6b is a plan view of an actuator including the front-and-back dual coils of the present invention showing the mode shape (not to scale) of a principal in-plane bending mode (sway) mode resonance.

FIGS. 6a and 6b show the mode shape (not to scale) due to excitation of the sway mode obtained for the concentric dual coil actuator 100 and the front-and-back dual coil actuator 110, respectively, by finite element simulation methods known to the art. In both FIGS. 6a and 6b, the undistorted actuator 120 is shown with the distorted actuator 122 for the simulation of the excited sway mode superimposed. For the finite element simulations of both actuators 100 and 110, the input force on the actuators was calculated for current flow in only one of the dual coils in each actuator in order to simulate the response of a single coil actuator as used in the prior art. The sway mode resonance excited in this way degrades the dynamic performance of the disk drive and should be suppressed to improve the settling and tracking operations of the disk drive.

Figure 7:
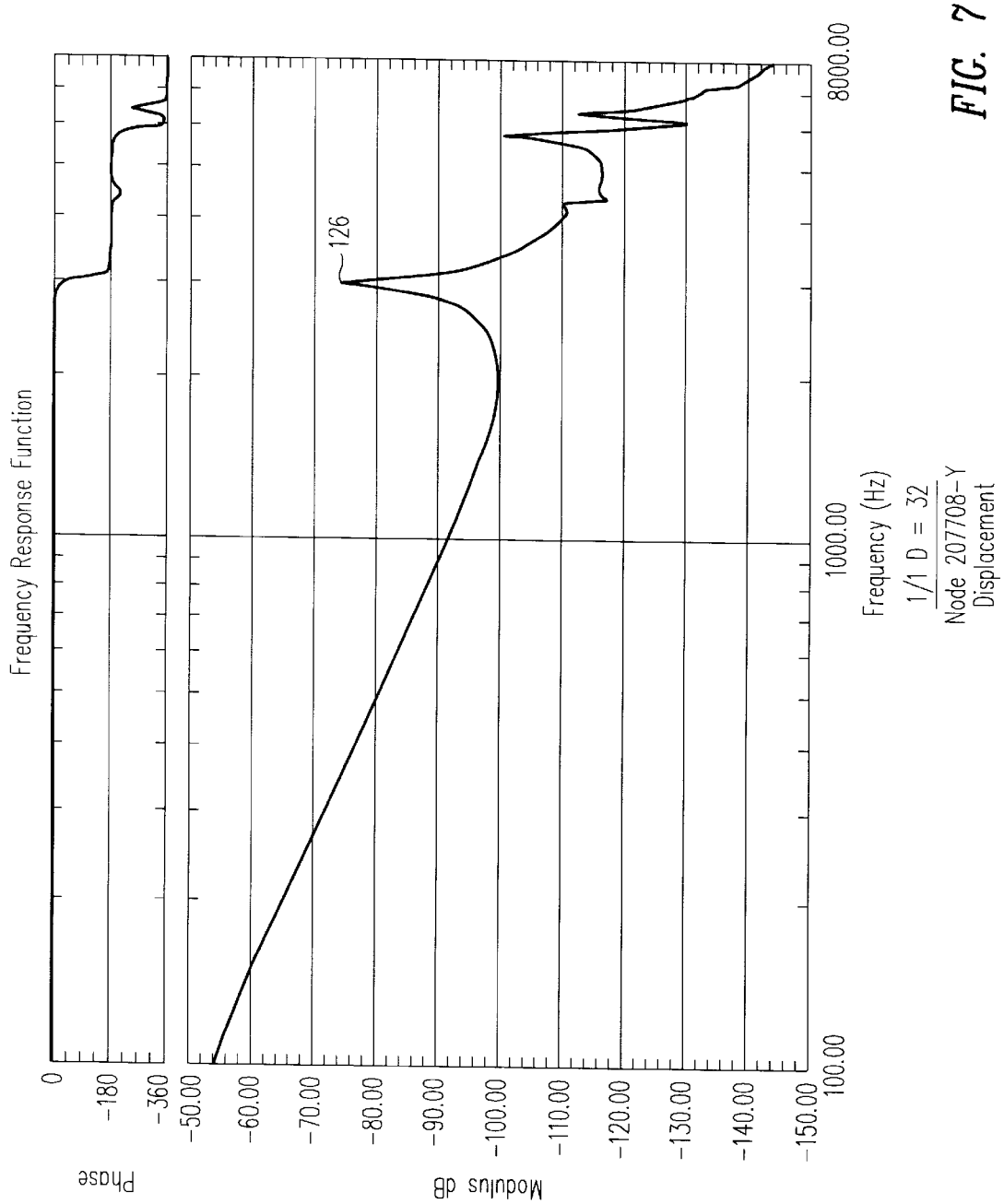
FIG. 7 is graph illustrating a transfer function obtained from a finite element simulation of the response of a concentric dual coil actuator to current in the outer coil only.
Figure 8:
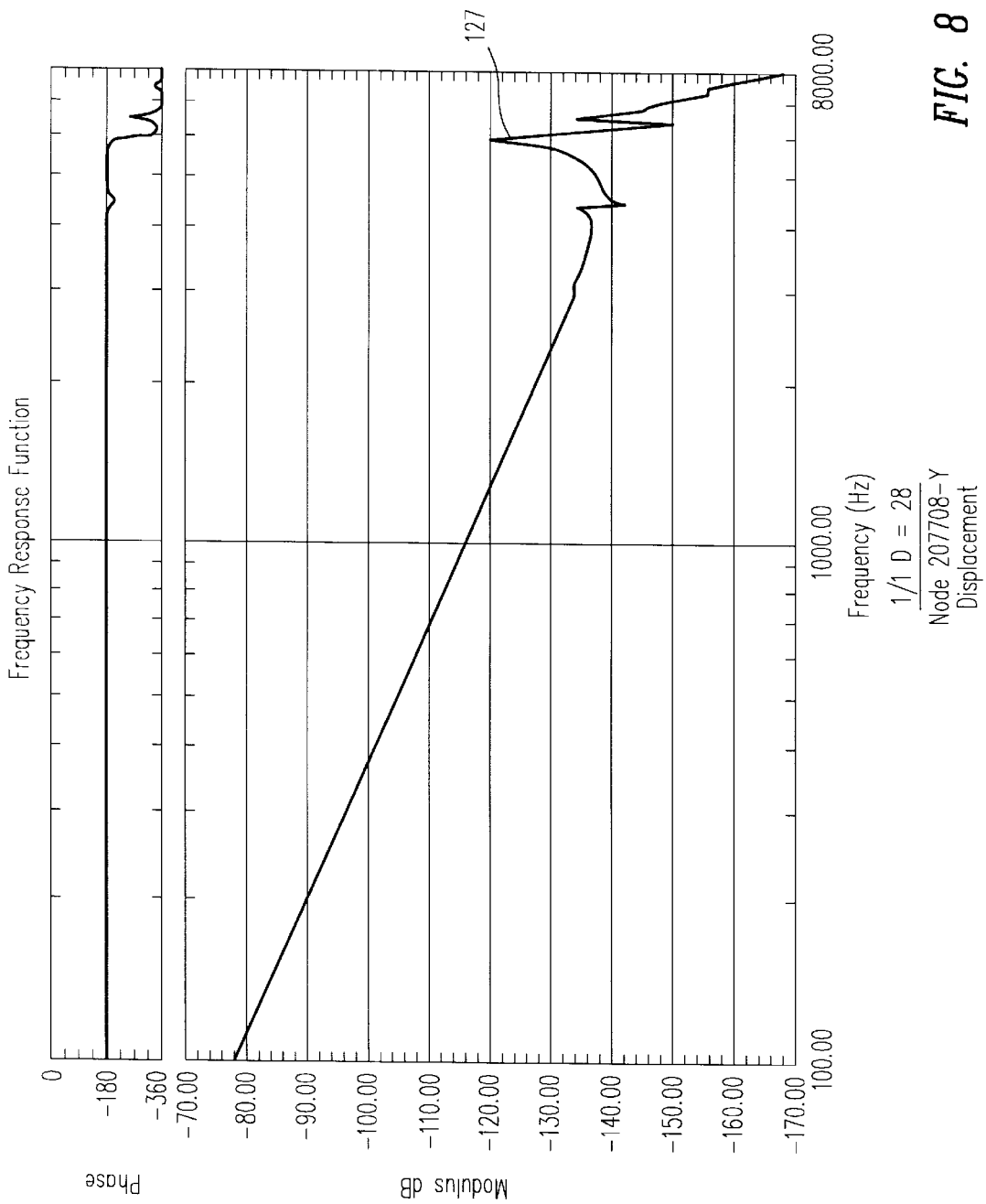
FIG. 8 is a graph illustrating a transfer function obtained from a finite element simulation of the response of a concentric dual coil actuator to current in the inner and outer coils.

FIGS. 7 and 8 show the mechanical transfer functions obtained from finite element simulations of the response of the concentric dual coil actuator 100 to actuator coil current generated forces. The transfer functions are graphs showing the vibration displacement amplitude and phase response at the slider/transducer as a function of frequency to VCM input forces applied to the actuator assembly in the plane of actuator rotation. FIG. 7 shows the transfer function obtained for coil current flowing only in the outer coil 102 to simulate single coil actuator conditions. The large amplitude peak 126 at approximately 3000 Hz corresponds to the sway mode resonance of the actuator shown in FIG. 6a. FIG. 8 shows the transfer function obtained for current flow in both the outer coil 102 and the inner coil 104 with the direction of current flow in the inner coil 104 having the opposite sense (clockwise or counterclockwise) to the current flow in the outer coil 102. The ratio $I_O/I_I$ of the magnitudes of the currents in the two coils has been adjusted to minimize excitation of the sway mode resonance. Absence of the peak at 3000 Hz shows that the sway mode resonance is not excited in the dual coil actuator as used in settling and tracking operations according to the present invention.

Choice of the optimum current ratio $I_O/I_I$ may be made by experimentation to obtain the best transfer function with dual coil operation or by the following process. A current having an amplitude $I_1$ is applied to the outer coil to measure the transfer function for the outer coil driving the actuator motion. The amplitude of the sway mode resonance peak, $Q_O$, is measured from the outer coil transfer function. The same current amplitude $I_1$ is applied to the inner coil to measure the transfer function for the inner coil driving the actuator motion. The amplitude of the sway mode resonance peak, $Q_I$, is measured from the inner coil transfer function. The optimum current amplitude ratio $I_O/I_I$ to use for dual coil operation in order to eliminate the sway mode resonance peak from the transfer function for the dual coils driving the actuator motion is given by $I_O/I_I=Q_I/Q_O$.

Figure 9:
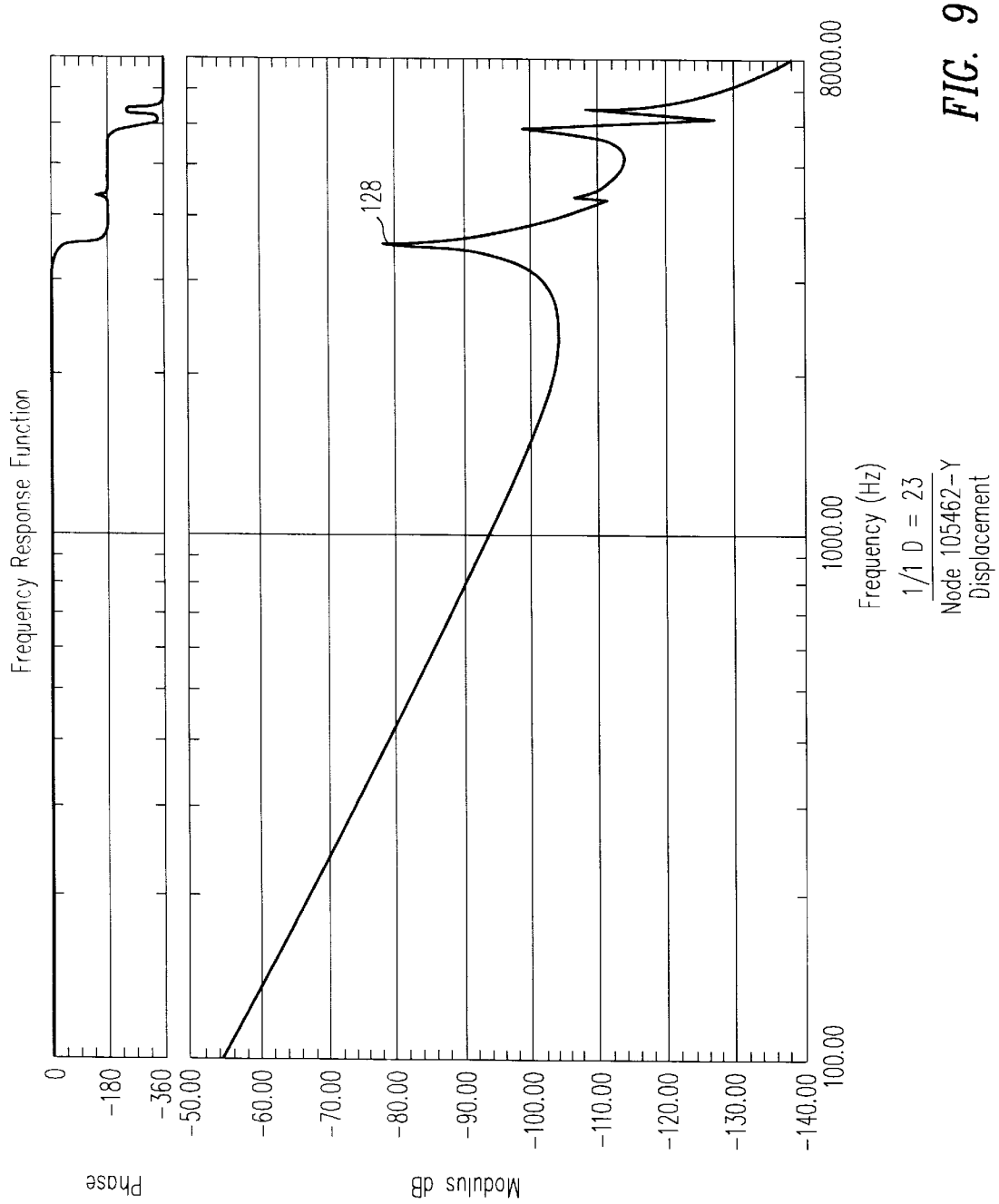
FIG. 9 is a graph illustrating a transfer function obtained from a finite element simulation of the response of a front-and-back dual coil actuator to current in the front coil only.
Figure 10:
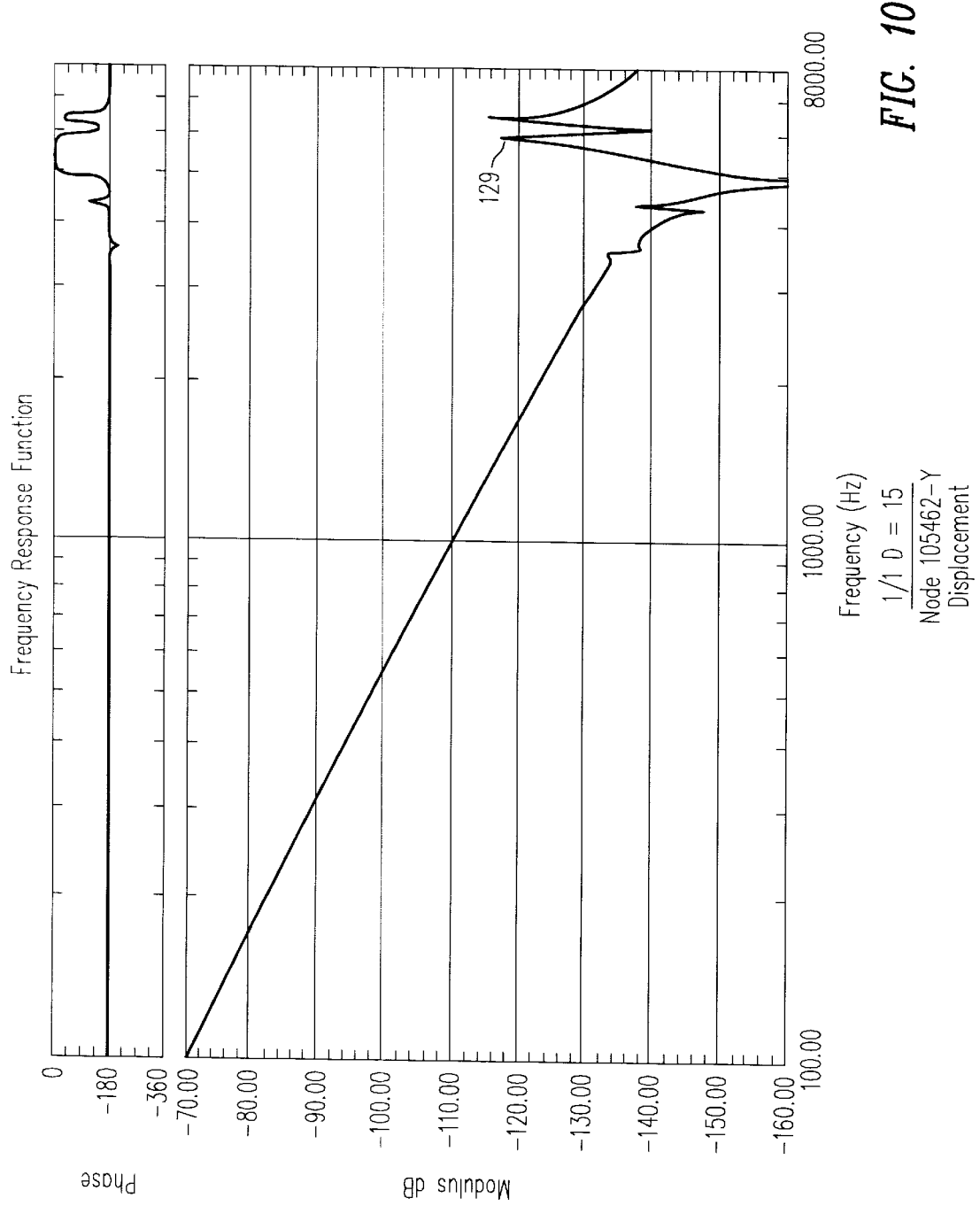
FIG. 10 is a graph illustrating transfer function obtained from a finite element simulation of the response of a front-and-back dual coil actuator to current in the front and back coils.

FIGS. 9 and 10 show the mechanical transfer functions obtained from finite element simulations of the response of the front-and-back dual coil actuator 110 to actuator coil current generated forces. FIG. 9 shows the transfer function obtained for coil current flowing only in the front coil 112 to simulate single coil actuator conditions. The large amplitude peak 128 at approximately 3600 Hz corresponds to the sway mode resonance of the actuator shown in FIG. 6b. The resonance has a higher frequency than was obtained for the concentric dual coil actuator 100 because of the different coil structure, coil mass and mass distribution. FIG. 10 shows the transfer function obtained for current flow in both the back coil 112 and the front coil 114 with the direction of current flow in the front coil 114 having the opposite sense (clockwise or counterclockwise) to the current flow in the back coil 112. The ratio $I_B/I_F$ of the magnitudes of the currents in the two coils has been adjusted to minimize excitation of the sway mode resonance. Absence of the peak at 3600 Hz shows that the sway mode resonance is not excited in the front-and-back dual coil actuator as used in settling/tracking operations according to the present invention.

Figure 11:
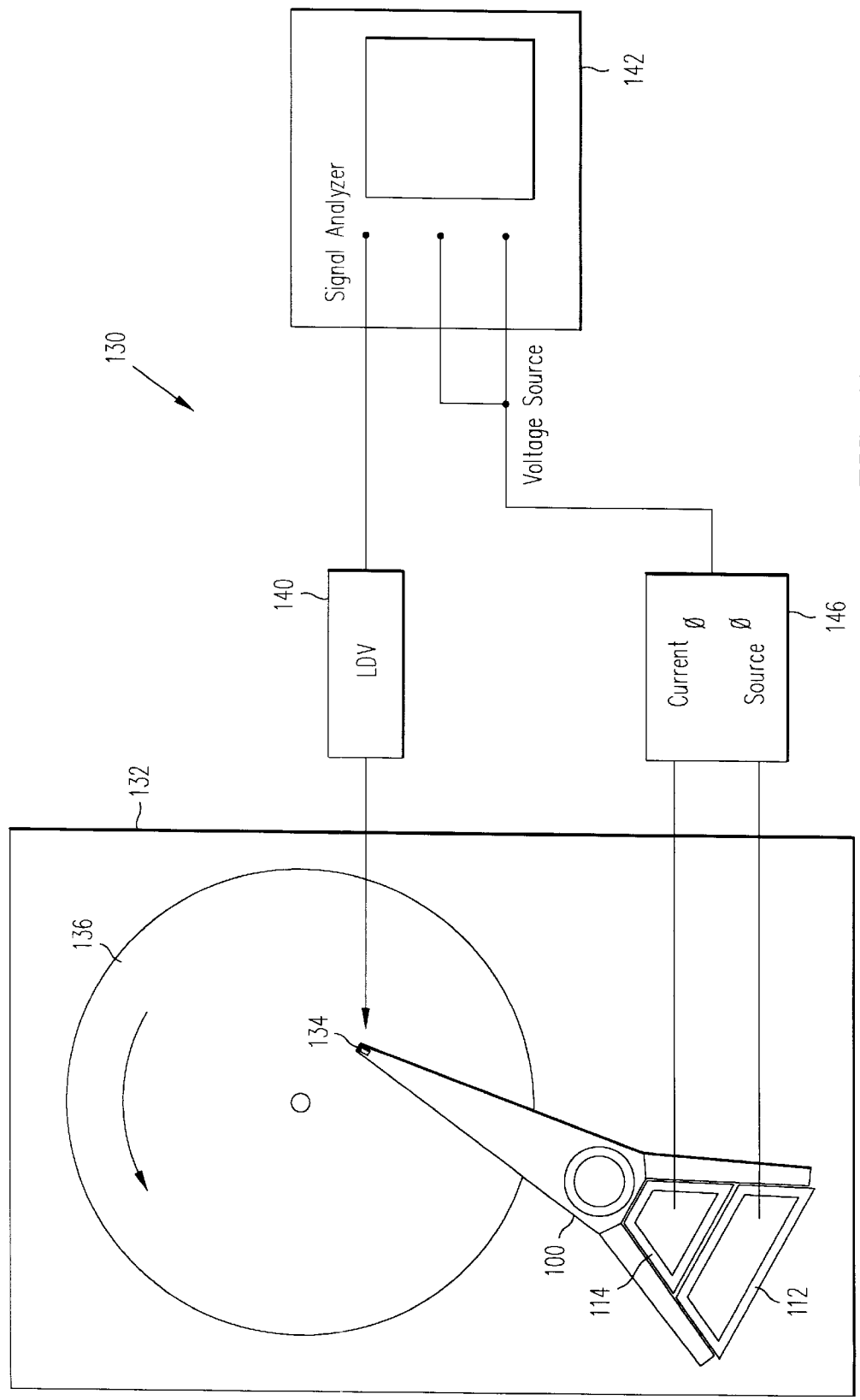
FIG. 11 is a schematic block diagram of an experiment to measure the transfer function for a dual coil actuator of the present invention.

FIG. 11 show the experimental setup 130 used to measure the transfer function for a front-and-back dual coil actuator 110 according to the present invention mounted in a magnetic disk drive 132. A laser light beam from a laser doppler vibrometer (LDV) 140 reflected from a slider 134 mounted on the actuator 100 and supported over the surface of a rotating disk 136 by an air bearing is used to measure the mechanical transfer function for slider positional response to actuator coil current generated forces. Current is provided to the back coil 112 and the front coil 114 from separate channels of a current source 146 driven by a sine wave voltage from a signal analyzer 142. The LDV 140 output signal is recorded and analyzed in the signal analyzer 142 to obtain the mechanical transfer functions.

Figure 12:
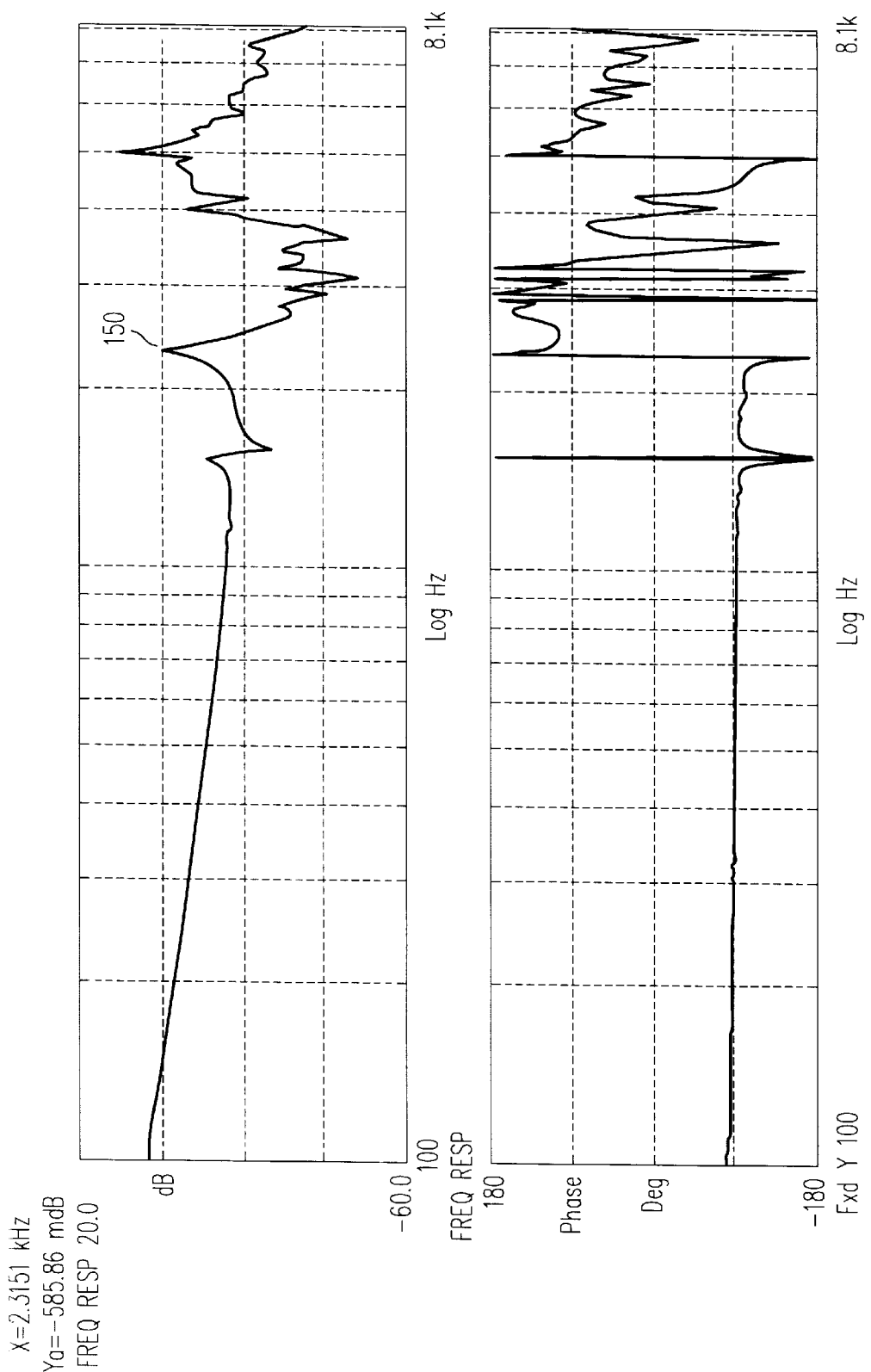
FIG. 12 is the measured transfer function for the response of a front-and-back dual coil actuator to current in the back coil only.
Figure 13:
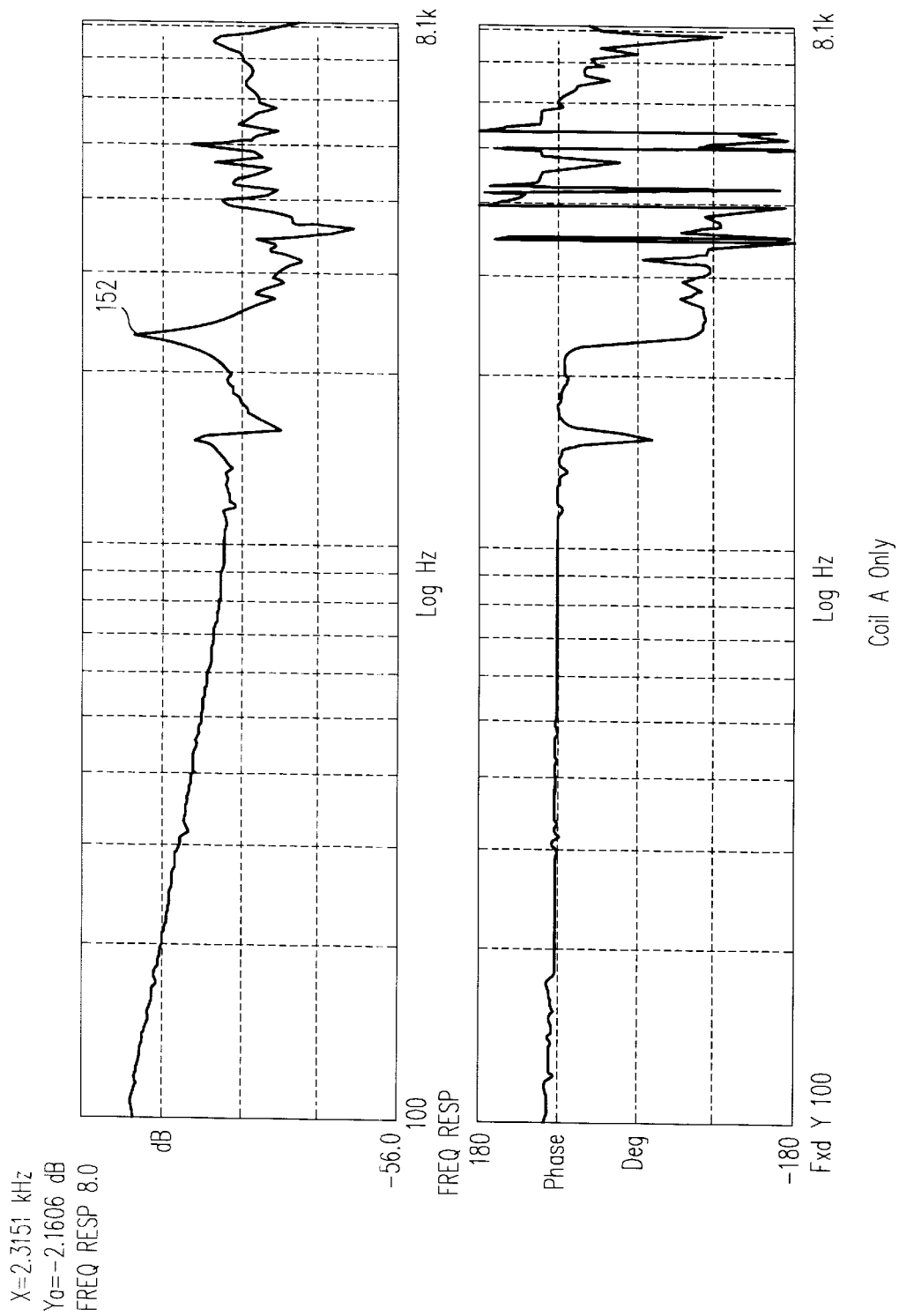
FIG. 13 is the measured transfer function for the response of a front-and-back dual coil actuator to current in the front coil only.
Figure 14:
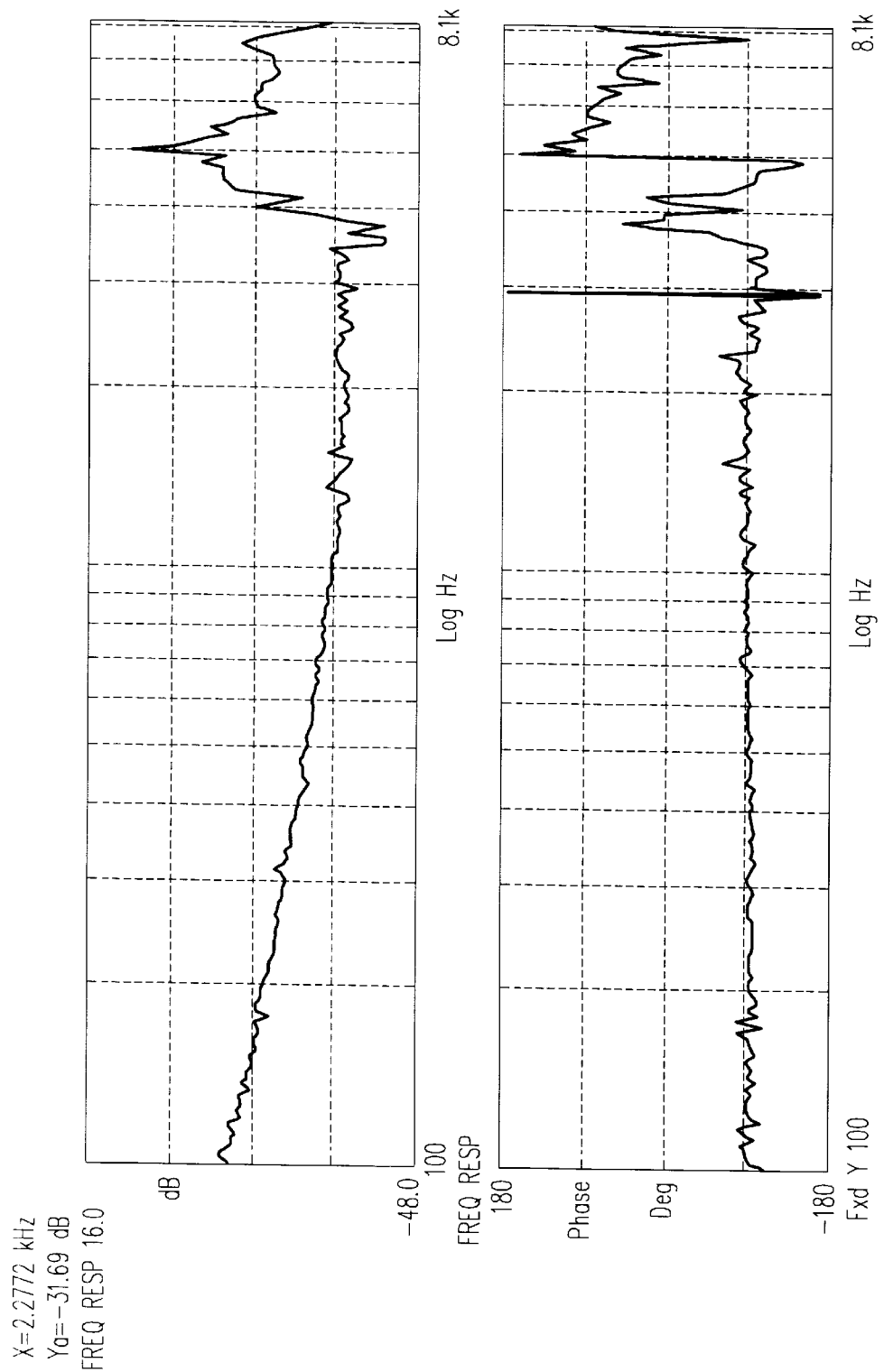
FIG. 14 is the measured transfer function for the response of a front-and-back dual coil actuator to current in the front and back coils.

FIGS. 12, 13 and 14 show the transfer functions obtained for current supplied to the back coil 112, to the front coil 114, and to both back coil 112 and front coil 114, respectively. The transfer function shown in FIG. 12 was obtained by driving the back coil 112 with a current having an amplitude $I_1$. The transfer function shown in FIG. 13 was obtained by driving the front coil 114 with a current having the same amplitude $I_1$. The peaks 150, 152 at a frequency of approximately 2300 Hz observed in both transfer functions are due to excitation of the fundamental bending mode (sway mode) of the experimental actuator. The transfer function shown in FIG. 14 was obtained by driving the back coil 112 with a current having amplitude $I_B$ and the front coil 114 with a current having amplitude $I_F$, where the current flows in the opposite sense (clockwise or counterclockwise) through the front coil 114 relative to the back coil 112. The relative amplitudes of the currents in the two coils were adjusted to satisfy the condition $I_B/I_F = Q_F/Q_B$, where $Q_B$ is the amplitude of resonance peak 150 due to driving the back coil 112, and $Q_F$ is the amplitude of resonance peak 152 due to driving the front coil 114 with the identical current amplitude. The transfer function shown in FIG. 14 has no resonance peak at 2300 Hz experimentally confirming the results of the finite element simulations discussed above. The lower resonance frequency observed in the experimentally measured transfer functions was due to a different structure and mass of the actuator coils used in the experiments.

Suppression of the sway mode resonance during the settling and tracking operations of the disk drive allows a significantly higher servo bandwidth to be used in the disk drive since this resonance is the fundamental limitation to servo stability in the single coil actuators of the prior art. The finite element simulations shown in FIGS. 8 and 10 for the actuator of the present invention indicate that the servo stability will now be limited by higher frequency modes 127, and 129 respectively, having resonant frequencies in the range of 5000–6000 Hz. This increase in the limiting frequency by 1500–2500 Hz will result in an increase in allowable servo bandwidth which in turn allows a comparable increase in track density.

In order to obtain the benefits of improved dynamic response during settling and tracking operations by using the dual coil actuator of the present invention without sacrificing the high performance seek operations of the single coil actuator of the prior art, the following method of disk drive operation is contemplated. When a new data track is to be accessed, the controller sends a command to supply peak currents to both coils of the dual coil actuator with current flow in each coil having the same sense. At about half way to the target position of the new data track, the peak currents are switched to the opposite sense in both coils to decelerate the actuator according to the optimal control algorithm of the seeking mode. When the transducer is about 1 to 5 tracks away from the target data track (depending on disk drive operation and control algorithm) the controller is switched to the settling and tracking mode. In the settling and tracking mode, the current in one of the coils is switched to have the opposite sense to the current in the other coil, the coil being switched depending on the desired direction of motion of the transducer. When the currents in the two coils have the opposite sense and are in the appropriate ratio, the actuator sway mode is suppressed while there is still a net torque to drive the actuator during track following. In the track following mode the servo bandwidth is improved because of suppression of the sway mode resulting in increased track following accuracy. In this mode of operation, two coil current power supplies are needed which are switchable by commands from the controller.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited in scope only as specified in the appended claims.

We claim:

1. A magnetic storage system, comprising:
   a disk with a concentric data surface of data tracks;
   a spindle shaft supporting said disk, said spindle shaft for rotating said disk about an axis generally perpendicular to the disk;
   a slider maintained in operative relationship with the data surface when the disk is rotating;
   a transducer attached to the slider for reading data from and writing data to the data surface;
   an electronics module for processing data read from and written to the data surface;
   a first and second current supply for providing electrical power; and
   an actuator for moving the slider generally radially relative to the disk to allow the transducer to access the data tracks, the actuator further comprising a body defining the actuator pivot point; a first coil support arm extending from the body; a second coil support arm extending from the body, said first and second coil support arms forming an angular sector therebetween; an outer actuator coil connected to the first current supply and affixed to the first and second coil support arms in the angular sector between said first and second coil support arms; and an inner actuator coil connected to the second current supply and affixed to the outer actuator coil, said inner actuator coil lying inside and in the same plane as said outer actuator coil.

2. The magnetic storage system as recited in claim 1, wherein a number of turns of wire forming the outer actuator coil is equal to the number of turns of wire forming the inner actuator coil.

3. A magnetic storage system, comprising:
   a disk with a concentric data surface of data tracks;
   a spindle shaft supporting said disk, said spindle shaft for rotating said disk about an axis generally perpendicular to the disk;
   a slider maintained in operative relationship with the data surface when the disk is rotating;
   a transducer attached to the slider for reading data from and writing data to the data surface;
   an electronics module for processing data read from and written to the data surface;

a first and second current supply for providing electrical power; and an actuator for moving the slider generally radially relative to the disk to allow the transducer to access the data tracks, the actuator further comprising a body defining the actuator pivot point; a first coil support arm having a proximal end extending from the body to a distal end; a second coil support arm having a proximal end extending from the body to a distal end, said first and second coil support arms forming an angular sector therebetween; a front actuator coil connected to the first current supply and affixed to the first and second coil support arms in the angular sector between the proximal ends of said first and second coil support arms; and, a back actuator coil connected to the second current supply and affixed to the first and second coil support arms in the angular sector between the distal ends of said first and second coil support arms, said back actuator coil lying in the same plane as said front actuator coil.

4. The magnetic storage system as recited in claim 3, wherein a number of turns of wire forming the front actuator coil is equal to the number of turns of wire forming the back actuator coil.

5. A method of operating an actuator having concentric dual coils to move a transducer to a data track on a disk surface, which comprises the steps of:

a) supplying an outer current and inner current having the same clockwise or counterclockwise sense to the outer coil and to the inner coil of the actuator respectively, to rapidly move the transducer to the proximity of the data track; and b) supplying the inner current having one sense to the inner coil and supplying the outer current having the opposite sense to the outer coil to accurately position the transducer over the data track and to maintain the position of the transducer over the data track.

6. A method of operating an actuator having front-and-rear dual coils to move a transducer to a data track on a disk surface, which comprises the steps of:

supplying a front current and rear current having the same clockwise or counterclockwise sense to the front coil and to the back coil of the actuator respectively to rapidly move the transducer to the proximity of the data track; and supplying the front current having one sense to the front coil and supplying the rear current having the opposite sense to the rear coil to accurately position the transducer over the data track and to maintain the position of the transducer over the data track.

* * * * *